United States Patent [19]

Cowfer et al.

[11] Patent Number: 5,635,438
[45] Date of Patent: Jun. 3, 1997

[54] CHROMIUM CATALYST AND CATALYTIC OXIDATION PROCESS

[75] Inventors: Joseph A. Cowfer, Medina, Ohio; George H. Young, League City, Tex.

[73] Assignee: The Geon Company, Avon Lake, Ohio

[21] Appl. No.: 258,293

[22] Filed: Jun. 10, 1994

[51] Int. Cl.$^6$ .................................................. B01J 23/00
[52] U.S. Cl. ........................................ 502/319; 423/245.3
[58] Field of Search .................... 502/309; 423/245.3

[56] References Cited

U.S. PATENT DOCUMENTS

| | | | |
|---|---|---|---|
| 4,031,149 | 6/1977 | Eden | 423/481 X |
| 4,169,862 | 10/1979 | Eden | 423/481 X |
| 4,239,872 | 12/1980 | Slaught | 502/320 |
| 4,369,295 | 1/1983 | McDaniel | 502/150 X |
| 4,892,716 | 1/1990 | Abe et al. | 423/213.7 |
| 5,093,300 | 3/1992 | Vogels et al. | 502/319 X |
| 5,160,636 | 11/1992 | Gilles et al. | 210/763 |
| 5,205,906 | 4/1993 | Grutsch et al. | 159/47.3 |

OTHER PUBLICATIONS

BFGoodrich Chemical Group; *Catoxid Process*; Jan. 1982.
James S. Benson, *Catoxid for Chlorinated Byproducts*; Oct. 1979.
Tichenor, et al.; Destruction of Volatile Organic Compounds via Catalytic Incineration; Environmental Progress vol. 6 No. 3; Aug. 1987.
Agarwal, et al. Deep Oxidation of Hydrocarbon; Applied Catalysis A: General 81 (1992) 239–255; Elsevier Science Publishers B.V. Amsterdam.
Ramanathan, et al.; Catalytic Oxidation of 1,1-Dichloroethane; Combust. Science and Tech. 1989 vol. 633 pp. 247–255.
Agarwal et al.; Catalyst Deactivation During Deep Oxidation of Chlorohydrocarbons; Applied Catalysis A: General 82 (1992) 259–275; Elsevier Science Publishers B.V. Amsterdam.

*Primary Examiner*—Michael Lusignan
*Attorney, Agent, or Firm*—Miles B. Dearth; Joe A. Powell

[57] ABSTRACT

In accordance with the present invention there is provided a method for making and using an improved chromium catalyst which is useful in oxidation of combustible materials such as hydrocarbons, chloro-carbons, chlorohydrocarbons, polymers and other combustible materials. The process for the catalytic oxidation of combustible material, comprises: contacting a combustible material in a heated reaction zone in the presence of oxygen and a chromium impregnated catalyst prepared by impregnating a supporting material with a chromium compound and calcining the solid material at a temperature and for a time at least sufficient for the supporting material to reach a temperature of at least 725° C. By the method the catalyst exhibits reduced loss of chromium to the environment.

10 Claims, 1 Drawing Sheet

CHROMIUM CATALYST AND CATALYTIC OXIDATION PROCESS

FIELD OF THE INVENTION

The field of the invention is supported catalytic oxidation of combustible materials, such as gases, liquids and solids, particularly halogenated materials.

BACKGROUND OF THE INVENTION

In the oxidation of chlorinated hydrocarbons, aluminum oxide in the form of particulate alumina is one of the materials of choice. There is an upper use temperature limit for the gamma form of alumina. Alumina is suitable by itself for the oxidation of hydrocarbons, however activated forms are available which contain one or more metal oxides, platinum, platinum/metal oxide, and others. Specific examples include $Cr_2O_3CuO/Al_2O_3$, $Pt/Al_2O_3$, $MnO_2/Cr_2O_3/Al_2O_3$, and those containing oxides of cobalt, nickel, vanadium, and molybdenum.

Commercial catalytic oxidation processes have been adapted for disposal of waste organic solvents, ground water pollutants, synthetic by-products, incinerator flue exhaust and automotive exhausts. In the large scale catalytic oxidation of chlorinated hydrocarbons, fuel value is typically recovered as steam and chlorine is recovered as HCl and/or $Cl_2$. Various approaches are taught in the patent and scientific literature.

Jamal Eden disclosed in British Patent No. 1,506,238 a $Cr_2O_3$ impregnated alumina, silica or mixture as a fixed or fluidized catalyst for treating the by-product waste stream from the oxychlorination of ethylene. The oxidized exit stream, free of chlorohydrocarbons, and containing HCl, can be re-used in the oxychlorination process. The catalyst comprised 10–50% $Cr_2O_3$ on 90–50% alumina. The temperature of the catalyst bed was maintained at from 300° C. to 450° C. Eden prepared the catalyst by impregnating alumina with aqueous $Cr(NO_3)_3.9H_2O$ or $CrCl_3.6H_2O$, drying over hot air, and calcining for approximately 16 hours at 540° C. The catalyst preparation of Eden is consistent with the conventional teaching that catalyst calcination temperature should be as high as the intended use temperature, and typically about 50° to 100° C. higher than the intended use temperature.

Ernest Johnston has disclosed in U.S. Pat. No. 3,989,807 the use of fluidizable $Cr_2O_3$/alumina catalyst for recovering chlorine values from direct liquid injection of chlorinated organic compounds mixed with air. In Johnston's process elemental chlorine ($Cl_2$) was recovered rather than the HCl intermediate. Johnston's catalyst preparation consisted of impregnation of chromium salt or oxide on the support, followed by drying and optionally conditioning at 350° C.–500° C. Johnston suggested generally a chromium metal content of from 0.1 to 20 weight percent, preferably 0.5 to about 10 percent, on a support having a surface area at least 50 m²/g, preferably at least about 200 m²/g.

William Hunter, et al. disclosed in U.S. Pat. No. 4,330,513 a catalytic oxidation process using conventional chromium on alumina. The catalyst comprised 15% to 25% by weight chromic oxide on a suitable attrition resistant carrier having a particle size ranging from 500 microns up to 0.25 inches. Hunter et al. suggested a catalyst preparation by conventional techniques with a preferred embodiment prepared by forming large preformed shapes such as pellets from an extruded support followed by calcining the bare support. Aqueous chromic acid was then applied at 120° F. followed by drying at 250° F. and calcining at 1300° F. (704° C.).

The deactivation of commercial chromia-alumina catalysts over long term exposure of streams containing 500 ppm of $C_1$–$C_2$ chlorohydrocarbons and mixtures has been studied. See S. K. Agarwal, J. J. Spivey and J. B. Butt *Catalyst Deactivation During Deep Oxidation of Chlorohydrocarbons*, Applied Catalysis A: General, 82, (1992), pp. 259–275. The authors found that during long term use-on-stream the reaction zone temperature needed to be increased in order to maintain high conversion rates. The authors observed steady deactivation for a mixed stream of chlorinated and non-chlorinated hydrocarbons. The temperature needed to be raised from 305° C. to 418° C. over 210 days to maintain conversion at or above 99%. The volatilization of chromium appears worse for chlorinated hydrocarbon feedstreams. The authors speculated that the volatilizing of chromium oxychloride may be beneficial in continuously exposing fresh catalyst surfaces.

In commercial scale catalytic oxidation of chlorinated materials, the maximum operating temperatures are limited by the optimal temperature range for the chosen catalyst as well as the corrosion resistance inherent in the metals used for the equipment. For example, certain economical nickel alloy steels undergo catastrophic corrosion in the presence of HCl at or above 530° C. Increasing the operating temperature of the reaction zone approaching this temperature will lead to higher corrosion rates. It would therefore be desirable from an economic standpoint to maintain very high conversion of 99% or higher of feedstocks over long periods of time without risking increased rates of corrosion. In view of the recognition that conventional chromium catalysts deactivate during long term exposure to chlorohydrocarbons, there is a need for eliminating deactivation or substantially reducing the rate at which a chromium catalyst loses its activity level.

The art related to supported oxidation catalysts recognizes loss in catalyst activity is caused by physical attrition, and transformations in the support material leading to a loss in surface area. Loss of active metal oxide follows with time-on-stream from physical attrition and volatilization in the form of chromium oxychloride which is increased in the presence of chlorinated feedstocks. The art suggests that in some processes, sloughing off of catalyst surface is beneficial for maintaining activity. The loss of the active metal from catalyst supports may be beneficial from a technical standpoint, however from an environmental view, metal loss is problematic because the effluent streams from catalytic oxidation processes must conform to local and state emissions regulations. The hexavalent chromium in chromium oxychloride ($CrO_2Cl_2$), for example, is listed as a carcinogen; and trivalent chromium is considered a toxic substance and there are stringent upper limits on their concentration in discharged waste. Therefore, it would be desirable to provide reduced chromium emissions in the waste effluent of catalytic oxidation processes.

The inventors have investigated the changes in metal oxide catalysts over time-on-stream in the catalytic oxidation of chlorinated hydrocarbons and have discovered a method of making a chromium impregnated catalyst which unexpectedly shows high stability and reduced chromium volatilization during long term use. Therefore the catalyst of the present invention is not only more economical in use but is also more environmentally friendly.

SUMMARY OF THE INVENTION

In accordance with the present invention there is provided a method of fixing chromium on a support. The method results in a chemical transformation in the catalyst which surprisingly reduces the loss of chromium during long term usage. The catalyst made by the method has also surprisingly shown no loss in activity after several thousand hours on-stream in the catalytic oxidation of chlorohydrocarbon feed stream. The method comprises contacting a solid support with a chromium compound, leaving a specified amount of chromium compound, and heating, as in calcining, the impregnated support to a temperature of from 725° C. to 1100° C. In accordance with the invention there is further provided a process for using a chromium catalyst for the oxidation of combustible solids, liquids and/or gases. The process for the catalytic oxidation of combustible material, comprises:

contacting a combustible material in a reaction zone at a reaction temperature of between 400° C. and 800° C. in the presence of air or oxygen, wherein the zone contains a catalyst comprising chromium which has been fixed to the supporting material by calcining at a temperature from about 725° C. to about 1100° C. The preferred process includes recovering the heat of reaction and chlorine value as HCl and/or chlorine.

The method of fixing chromium on the support at higher temperatures causes greater loss in the surface area of the support compared with conventional methods. However, it was unexpectedly found that this catalyst surprisingly shows significantly less chromium loss and very high conversion over extended periods of time without the need for gradually increasing the processing temperature. The optimum operating temperature of the process may be comparatively higher than with conventional chromium catalysts in some instances, yet very high conversion rates are sustainable over a long period of time and there is no formation of any highly undesirable compounds (HUCs), such as polychlorinated biphenyls, dibenzofurans, or dibenzodioxins.

DETAILED DESCRIPTION OF THE PREFERRED EMBODIMENT

Figure 1:
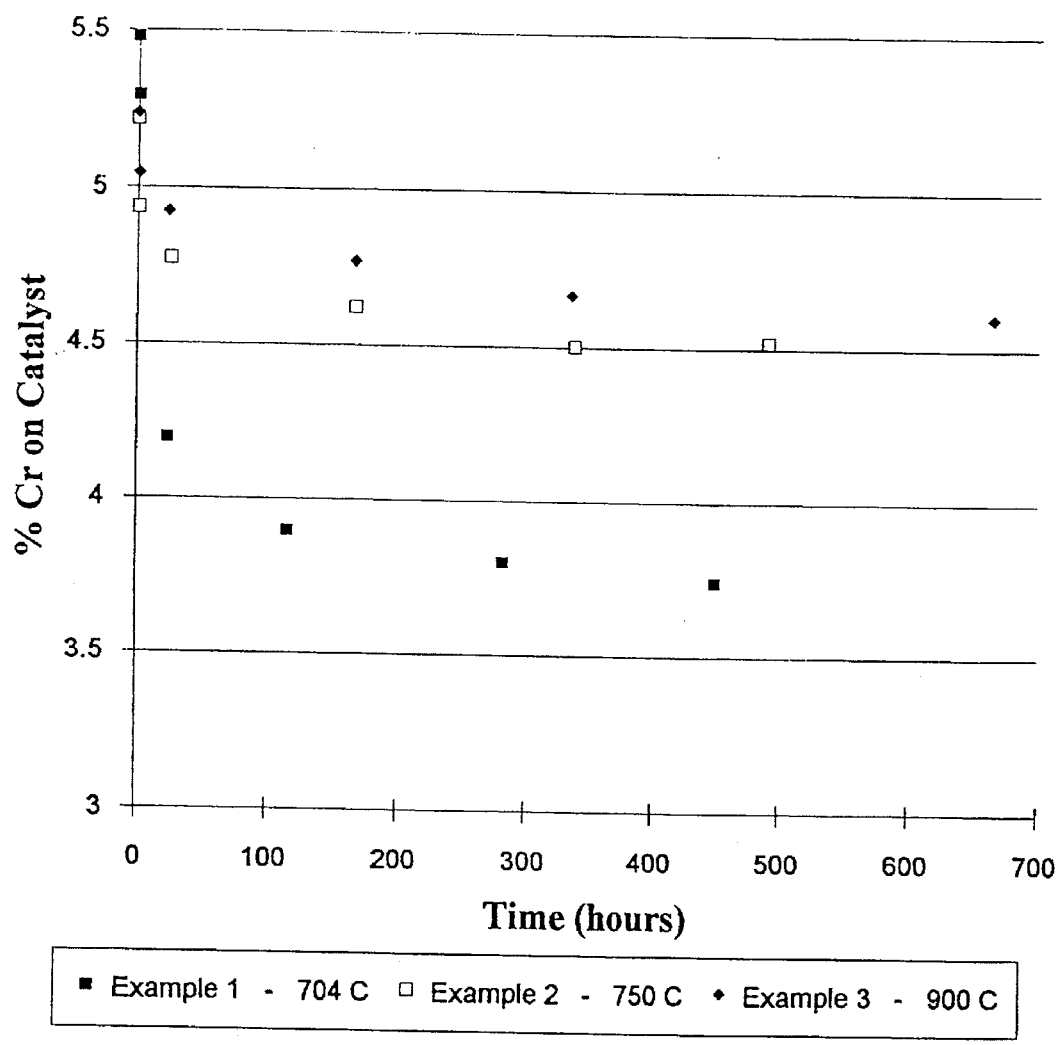
FIG. 1 is a plot of the weight percent chromium in the catalyst on the y-axis versus time-on-stream in hours for 3 catalysts having chromium fixed to the support by calcining at 704° C., 750° C. and 900° C.

The method of making the catalysts and catalytic oxidation methods are adapted for fixed-bed or fluid bed processes, depending on the chosen physical attributes for the solid support material. The catalysts are those containing from 0.1% to 30%, preferably 0.5 % to 20%, more preferably 2% to 10% and most preferably 4% to 6% by weight, based on the total weight of catalyst, of chromium metal which has been fixed to the support at a temperature of from 725° C. to 1100° C. The chromium compound deposited on the support can be from a suitable form such as $CrO_3$ or $CrCl_3$. The preferred catalyst support has a surface area of from 100 to 250 square meters per gram, and preferably from 130 to 220 square meters per gram ($m^2/gm$) prior to impregnation with chromium compound. In the preparation of an alumina catalyst suitable for fluidized bed processes, for example, calcination at 725° C. -1100 ° C. will cause an appreciable reduction in the catalyst surface area. A 30% to 60% reduction in the surface area of alumina is expected. After calcination, the surface area of the catalyst will range typically from 50 to 150 $m^2/$ g. The preferred range of temperature of calcination is from 750° C. to 1100° C., more preferably from 800° C. to 1100° C., still more preferably from 850° C. to 1100 ° C. and most preferably from 900° C. to 1100° C.

The method of fixing chromium on the support is readily adapted for making a fixed bed catalyst. A suitable method of preparing a fixed bed embodiment consists of preparing dried and extruded or pelletized alumina followed by treating with chromium and calcining. Dried and formed alumina ($Al_2O_3$) is prepared by any one of a number of techniques well known in the industry. For example, sodium aluminate can be reacted with a suitable reagent to cause precipitation of aluminum hydroxide gel. Alternatively, a suitable alkali such as ammonium hydroxide is added to an aluminum salt such as aluminum sulfate or aluminum chloride in an amount sufficient to form aluminum hydroxide. Upon drying and calcining, the aluminum hydroxide is converted to alumina. The alumina is mulled with the slow addition of water until the moisture content is approximately 50% and the consistency of the mulled alumina is appropriate for extrusion. The alumina is then extruded through a 0.125 inch (0.317 cm.) die and the extruded pieces about 0.125 to about 0.375 inch long (0.317 to 0.95 cm.) are dried on a tray or belt dryer followed by calcination at from 1 to 4 hours at a temperature of between 480° C. to 750° C. The calcined extrudate is characterized by high surface area and high porosity. The extruded particles are impregnated with a aqueous (eg. 50%) solution of chromic acid at a temperature of about 50° C. The impregnated extrusions are then dried at 120° C. followed by calcining for a time at least sufficient for the material to reach 725° C. and preferably higher. In practice the dwell time during calcination will range from an hour to 24 hours, however, good results occur with tray drying in 3 hours. Alumina is commercially available from a variety of sources including Alcoa Industrial Chemicals Division, Bauxite, At., USA or Alcoa International, Lausanne, Switzerland.

For the sake of brevity, examples of the present invention will be demonstrated using a suitable fluidizable catalyst. In the preparation of catalysts suitable for fluid bed oxidation, the preferred particles have the largest proportion of their particles in the range of average diameter from 40 to 140 microns. Very small particles or "fines", having an average diameter below about 20 microns are preferably avoided. Catalyst fines can be recovered during catalytic oxidation by cyclone separators, for example.

Examples of chromium salts and oxides which may be impregnated on the support include chromium chloride and chromous chloride; chromium oxide, e.g., chromium dioxide; chromium phosphate, e.g., chromic phosphate; chromium acetate, e.g., chromic acetate; chromium formate, e.g., chromic formate, chromium nitrate, e.g., chromic nitrate; chromium bromide, e.g., chromous bromide; chromium carbonate, e.g., chromous carbonate; chromic hydroxide, barium chromate, and potassium dichromate. Chromium chloride and chromic acid are preferred. Chromic acid is most preferred. In comparisons between fluid bed catalysts made with chromic oxide or chromium chloride, no appreciable differences are seen in effectiveness. A variety of commercial sources for chromium compounds may be found in the *Chemicalweek Buyers Guide*, October 1991, Chemicalweek International, Inc., incorporated herein by reference.

The amount of chromium metal present can generally range from 0.1% to 30%, but 2% to 10% by weight chromium metal on the support is preferred. More preferably, chromium content is from 4% to 6% by weight of the total weight of catalyst. The chromium compound is conveniently dissolved in water for impregnating the support. In terms of weight percent chromium oxide, 0.3% of chromium oxide is an equivalent of 0.1% on a chromium metal basis; a 2% chromium metal content is equal to 6% on the basis of $Cr_2O_3$; a 10% chromium metal basis is equal to 29% on the basis of $Cr_2O_3$.

Non-limiting examples of solid supports suitable for impregnation and use may include alumina, silica-alumina, molybdenum-alumina, activated alumina, silica gel, diatomaceous earths, Fullers earth, kieselguhr, pumice, asbestos, kaolin, bentonite, zeolites, (e.g., zeolites A, X and Y), silica-magnesia-alumina, and chromia-alumina. Alumina supports, and particularly alumina supports having predominately the gamma form are most preferred. Commercial varieties of gamma alumina may be obtained from Engelhard Corp., Chemical Catalyst Group. The support may be agglomerated or fused through a pelletizing or extrusion process as discussed above for fixed bed reactors, or a spray dried and calcined powder for fluid bed applications.

The types of feed stocks usable with the process are innumerable combustible materials in any form which can be conveyed to the combustion reaction zone. For example, chlorinated hydrocarbons generally are compounds or mixtures comprising only carbon, chlorine and hydrogen, or carbon, chlorine hydrogen and oxygen. Such chlorinated hydrocarbons may be lower molecular weight materials e.g. containing from 1 to about 30 carbon atoms, and more typically from 2 to 8 carbon atoms, or such chlorinated hydrocarbons may be of higher molecular weight, i.e., chlorine-containing polymers or resins having a molecular weight of up to about 1 million or more. The feed stock may be waste gases from an incinerator, or a by-product stream from chemical synthesis processes such as in vinyl chloride or chloroprene production, food processes, coating or other solvent handling processes. Specific examples of combustible materials contained in waste streams are chlorinated hydrocarbons including the various isomers of chlorinated benzene, tetrachlorobutenes, trichloropropenes, waste materials from cracking of ethylene dichloride to vinylchloride, dichloropropane, dichloroethylene, trichloroethylene, trichloroethane, pentachlorobutane, hexachlorodibenzodioxin, hexachlorodibenzofuran, tetrachlorobiphenyl, the by-product waste stream from the oxychlorination of ethylene, polyvinyl chloride, polyvinylidene chloride, polychloroprene, PTFE and chlorinated polyethylene, to name a few. In the most preferred practice of the process of using the chromium activated catalyst, feedstocks preferably contain zero or very low amounts (<100 ppm) of metal impurities like copper, potassium or sodium. Care should be taken to substantially eliminate these contaminants from the feedstock prior to treatment.

The extent of chromium metal loss in prior art catalysts is directly proportional to the total feedstock fed through the reaction zone. Thus, with more concentrated feeds, the chromium loss rate would be relatively higher. The method of making the catalyst in the present invention enables using the catalyst for catalytic oxidation of combustible materials with a lower chromium metal loss under conditions of relatively high concentrations of chlorinated feedstock. Furthermore, the method of use enables high conversion of polychlorinated species which are relatively difficult to completely oxidize.

The combustible materials may be reacted in any physical form conveyable to the reaction zone. For example, chlorinated organic compounds may be vaporized with or without water and mixed with oxygen or an oxygen-containing gas in the reaction zone or prior thereto. Organic compounds which are not easily vaporizable may be introduced into the reactor zone as a liquid in the form of, for example, droplets, mists or air atomized jet. If necessary, chlorinated organic compounds which are normally solid at reaction temperatures or which sublime upon heating may be dissolved in a liquid solvent such as lower boiling chlorohydrocarbon(s) prior to introduction into the reaction zone or they may be introduced into the reaction zone as a slurry or as a solid. Solid polymer particles as ground or chopped pieces can be metered by a ribbon blade into the reaction zone.

A description of a suitable fluid bed reactor and a fixed bed reactor is found in a review article entitled *Vinyl Chloride* by J. A. Cowfer and A. J. Magistro, Kirk Othmer Encyclopedia of Chemical Technology, Vol. 23, 3rd Ed., (1983), John Wiley, pp. 865–885, which is incorporated herein by reference. Fluidized bed reactors can be cylindrical vessels made of corrosion resistant nickel alloy steel, equipped with internal coils for heat removal (usually as steam) and either internal or external cyclones used for capturing fine catalyst particles.

Fixed bed reactors typically resemble multi-tube heat exchangers with catalyst packed in vertical tubes held in a tube sheet at top and bottom. Reaction heat is removed typically by steam generation on the shell side of the reactor or by some other heat-transfer fluid. Inert diluent mixtures with catalysts may be employed and packed in certain proportions so that low catalyst activity is at the inlet and with a gradient of catalyst activity toward the exit end. The reactor steel can be nickel alloys constructed with regard to either fluid bed or fixed bed configurations. The primary considerations for the catalytic oxidation process are the temperature of processing, balancing of carbon to oxygen from the feedstock, balance of hydrogen to chlorine ratio and contact time within the combustion reaction zone. Calculation of proper ratios can be made after characterizing the feedstock composition. For example, an indirect measure of chlorine content in an organic liquid feedstock can be estimated by the density of a representative sample. Generally a stoichiometric equivalent or an excess of molecular oxygen to carbon ($O_2$:$C_2$) should be maintained to ensure complete combustion. The preferred mole ratio of oxygen to carbon is at least 1.1:1. Quantitative measurement of excess oxygen in the effluent stream can be made for monitoring and controlling the rate of air or oxygen introduced relative to the feed rate of the combustible material. Under the preferred conditions recovery of chlorine in the effluent stream of the process is in the form of predominantly HCl. The amount of $Cl_2$ produced is preferably present at up to about 20% of the total chlorine in the effluent stream. The hydrogen:chlorine mole ratio favoring predominantly HCl formation is greater than about 1.4. A suggested mole ratio is from 1.4 to 5.5.

The temperature of combustion in the present process at which greater than 90% of the combustible materials are converted generally is above 300° C. The optimum temperature depends upon the chemical composition of the feedstock. Chlorinated aromatic hydrocarbons are more difficult to completely oxidize, therefore relatively higher processing temperatures are preferably maintained, e.g. 455° C.–525° C. Greater than 99% conversion is achieved at from 455° C. and above.

The reaction zone residence time may be from several seconds to several hours, more typically several seconds up to several minutes, e.g., from about 1 second up to about 2 minutes. Preferably, residence time is from about 5 seconds up to about 100 seconds, and most preferably from about 5 seconds up to about 50 seconds.

Atmospheric, sub-atmospheric or super-atmospheric reaction pressures may be employed within the reaction zone. The reaction pressures typically may be from about 0.5 atm absolute to about 15 atm absolute, more typically from about 0.5 atm absolute to about 10 atm absolute and preferably from 1 to about 7 atm absolute.

In the typical start up of a catalytic oxidation process, hot air is fed through the catalyst bed to reach a temperature of about 300° C. A low odor paraffinic hydrocarbon is introduced next, and the heat of reaction usually enables the desired reaction temperature to be reached. The intended feedstock is then introduced and the process modulated to achieve steady state conditions and a 99+% conversion of feedstock to chlorine values, carbon oxides and water. The simplest method for monitoring the proper carbon to oxygen ratio is by measuring the excess oxygen remaining in the vent gas. When the feed stock is characterized and can be expressed as a chemical equation, then the mole ratio of carbon to oxygen is determined by ordinary stoichiometry. Over time, additional catalyst is incrementally added to maintain optimum conditions as attrition occurs.

The invention is more clearly understood in view of the examples presented below for the preparation of catalyst and the oxidation process utilizing the catalyst. Experiments were conducted to compare the extent of chromium loss on-stream relative to the catalyst preparation method. As previously noted, chromium attrition from the catalyst ends up in the effluent stream from the oxidation reaction and in accordance with environmental restrictions, chromium must be accounted for in the waste effluent.

EXAMPLES 1-3

Chromium impregnated catalyst was prepared by dissolving 256 g of $CrCl_3.6H_2O$ in 300 ml distilled $H_2O$ until a clear solution was obtained. A planetary mixer was used with 845 g of gamma alumina under slow mixing. The aqueous chromium was slowly added over several minutes. The catalyst was dried and divided into separate portions for calcining at different temperatures as listed below. Calcination was conducted in the presence of steam over night. In the commercial preparation of the catalyst, a conventional rotary calciner can be used. Residence time during calcination of the impregnated solid catalyst can conceivably extend from a few seconds to several hours depending on the rate of heat transfer to the catalyst material, however it is sufficient that the solid catalyst material actually reaches at least 725° C., preferably at least 800° C., more preferably at least 850° C., and most preferably at least 900° C. Excessive residence time is uneconomical, can unnecessarily reduce the surface area of the catalyst via phase transformation, particularly with gamma alumina supports. Examples 1 to 3 were calcined under the following conditions.

| EXAMPLE | CALCINATION TEMPERATURE |
| --- | --- |
| control 1 | 704° C. |
| 2 | 750° C. |
| 3 | 900° C. |

Each sample of catalyst was separately tested in a laboratory quartz fluid bed reactor having 30 mm i.d. and equipped with heating elements for temperature control. The height of the fluidized bed was approximately 18 inches. The top section of the quartz tube was tapered to an internal diameter of approximately 60 mm to act as a cyclone for retaining catalyst particles. A column of 180 cc of each catalyst was used. A feed stock containing 31% by weight perchloroethylene and 69% by weight dichlorobenzene was fed through an inlet approximately 1 inch above the bottom of the reaction bed which was maintained at 450 ° C. The rate of feedstock flow into the reaction zone was 0.14 g/min. after start-up. An air stream was split into 2 equal streams. One stream was mixed with the feedstock just prior to entry into the bed, with the other air stream entering at the bottom of the quartz reactor. The total air feed rate was about 27 m-moles/min. Effluent gases were bubbled through water and then dried in a desiccator prior to analysis using a gas chromatograph. Chromium content in the catalyst was analyzed initially and over time using XRF analysis. Chromium content was determined using a Fisons ARL 8410 X-ray fluorescence analyzer. The analysis employed the chromium K-alpha 1,2 at 69.36 degrees on a LIF 200 crystal and FPC detector. The X-ray tube was operated at 50 Kv and 50 Ma. The results are illustrated in FIG. 1 and table 1 below.

TABLE 1

|  | HOUR | Cr content (wt. %) | % LOSS |
| --- | --- | --- | --- |
| EXAMPLE 1 | 0 | 5.48 | 0.0 |
|  | 1 | 5.29 | 3.3 |
|  | 24 | 4.19 | 23.4 |
|  | 116 | 3.89 | 28.9 |
|  | 282 | 3.8 | 30.7 |
|  | 450 | 3.739 | 31.7 |
| EXAMPLE 2 | 0 | 5.22 | 0.0 |
|  | 1 | 4.93 | 5.2 |
|  | 26 | 4.77 | 8.1 |
|  | 168 | 4.62 | 10.95 |
|  | 338 | 4.50 | 13.14 |
|  | 491 | 4.51 | 12.83 |
| EXAMPLE 3 | 0 | 5.24 | 0.0 |
|  | 1 | 5.04 | 3.47 |
|  | 24 | 4.92 | 5.71 |
|  | 167 | 4.77 | 8.52 |
|  | 335 | 4.66 | 10.42 |
|  | 664 | 4.6 | 11.64 |

It can be seen that Example 1 shows a 31.7% loss of chromium after 450 hours on-stream. Example 2 surprisingly showed reduced chromium loss of 12.8% after 491 hours-on-stream and example 3 showed a further unexpected reduction in chromium loss of 11.6% after 664 hours on-stream. The dependant variable controlled for was the temperature of the calcination step and the data shows a significant unexpected transition in the degree of chromium fixation occurring between 704° C. and 750° C. Calcining at 725° C. provides unexpectedly less chromium loss over time compared with calcining at 704° C. A reduction in chromium emission in the waste effluent gases on the order of the difference between examples 1, 2 and 3 can be appreciated on a commercial scale. For example, at 100,000 lbs. (45,400 kg.) of reactor capacity corrected for a 0.15% daily loss of catalyst through physical attrition, the annual amount of chromium metal due to volatilization would be as follows:

| Emission using catalyst #1 (lb./yr) [kg.] | Emission using catalyst #2 (lb./yr) [kg.] | Emission using catalyst #3 (lb./yr) [kg.] |
| --- | --- | --- |
| 2476 [1,124] | 1006 [456] | 928 [421] |

In a separate long term trial using a chromium catalyst made according to the invention which included a calcination step at 900° C., this catalyst showed an initial chromium loss of approximately 10% during the first several hundred hours of use on-stream with a feed stock consisting of 31% perchloroethylene and 69% dichlorobenzene. This catalyst surprisingly showed no further loss in chromium, and has undergone no change in activity after more than 3,000 hours on-stream, at constant temperature.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A process for preparing an oxidation catalyst used in the oxidation of combustible materials, comprising:

contacting a solid supporting material comprising alumina with a chromium compound to form a treated supporting material, drying said treated supporting material, and calcining said treated supporting material at a temperature and for a time at least sufficient for said treated supporting material to reach a temperature of from 725° C. to 1100° C.

2. The process of claim 1 wherein said solid supporting material is selected from the group consisting of alumina, silica-alumina, molybdenum-alumina, activated alumina, zeolite, and silica-magnesia-alumina.

3. The process of claim 2 wherein said solid supporting material is alumina.

4. The process of claim 1 wherein said calcining temperature ranges from 900° C. to 1000° C.

5. The process of claim 1 wherein said oxidation catalyst is of a suitable shape and size for use in a fixed bed reaction zone.

6. The process of claim 1 wherein said oxidation catalyst is of a suitable shape and size for use in a fluidized bed reaction zone.

7. The process of claim 1 wherein the amount of chromium metal contained in said catalyst is from 0.1% to 30% by weight.

8. The process of claim 1 wherein the amount of chromium metal contained in said catalyst is from 2% to 10% by weight.

9. The process of claim 1 wherein the amount of chromium metal contained in said catalyst is from 4% to 6% by weight.

10. The process of claim 7 wherein said catalyst has a surface area of at least $50 M^2/g$.

* * * * *